United States Patent
Beaulieu

[15] 3,678,101
[45] July 18, 1972

[54] PROCESS FOR MAKING METHYLOLATED PHENOL-SULFONIC ACID

[72] Inventor: Raymond D. Beaulieu, North Wilbraham, Mass.

[73] Assignee: Monsanto Company, St. Louis, Mo.

[22] Filed: April 17, 1970

[21] Appl. No.: 29,646

[52] U.S. Cl. ..................................................260/512 R
[51] Int. Cl. ..................................................C07c 143/42
[58] Field of Search ...................................260/512 R

[56] References Cited

UNITED STATES PATENTS

| | | | |
|---|---|---|---|
| 2,326,578 | 8/1943 | Thuau | 260/512 |
| 2,448,029 | 8/1948 | Heusted et al. | 260/512 |
| 2,865,956 | 12/1958 | Ellis et al. | 260/512 |

Primary Examiner—Daniel D. Horwitz
Attorney—John W. Klosster, James C. Logomasini, Richard W. Sternberg and Neal E. Willis

[57] ABSTRACT

Process for making aqueous solutions of methylolated phenol sulfonic acid which are substantially free from excess alkali. The process uses hydroxides of Group IIA metals as basic condensation catalysts for $CH_2O$ and phenol-sulfonic acid, and $CO_2$ to precipitate insoluble carbonate salts at conclusion of condensation.

9 Claims, No Drawings

PROCESS FOR MAKING METHYLOLATED PHENOL-SULFONIC ACID

BACKGROUND

In the manufacture of water-soluble, sulfonated, thermosettable phenol-aldehyde resin systems, methylolated phenol sulfonic acid is a key component. Although heretofore described in the prior art (see, for example, Kressman et al in J. Chem. Soc. 1949, pp. 1190–1193), so far as I am aware no one has heretofore known how to make methylolated phenol sulfonic acid (that is, the condensate of formaldehyde and phenol sulfonic acid) in a relatively alkali-free form using an industrially practical process.

Prior art processes for making methylolated phenol-sulfonic acid all characteristically produce strongly basic aqueous solutions of such methylolated acid in salt form. If such a solution product is then (in combination with a resole resin) used to impregnate a porous substrate medium followed by thermosetting to render the resin system water insoluble, there is produced an ion-exchange medium which must be preliminarily given at least a water wash to remove the excess alkali otherwise such excess alkali will contaminate liquids passed through the ion-exchange medium, a result which is usually detrimental and undesirable.

The excess alkali and strongly basic character of prior art solutions of methylolated phenol-sulfonic acid results from the fact that the condensation of phenol-sulfonic acid with formaldehyde proceeds most favorably when in aqueous liquid phase conditions using elevated temperatures (generally ranging from about 50° C. up to reflux temperatures) only in the presence of a basic catalyst which makes the pH of the system fall above about 7.5, and preferably above about 8.5. Typical base catalysts used are usually selected from among inorganic and organic bases, with Group I and Group II (of the Periodic Table of the Elements) metals being most common cations.

To avoid the extra step of washing a sulfonated phenolic resin impregnated porous ion-exchange medium to remove such excess alkali, it is obviously necessary to use a methylolated phenol sulfonic acid which is free, or substantially free, from excess alkali or salt. However, to separate excess alkali from a water solution of methylolated phenol sulfonic acid is a time consuming, costly operation (by prior art techniques) which can make the product salt free methylolated phenol-sulfonic acid so expensive as to be non-competitive and impractical for utilization in ion-exchange applications. The problem, then, of manufacturing substantially alkali free and salt free water solutions of methylolated phenol sulfonic acid has thus become a commercial problem of considerable magnitude for which no known answer exists.

SUMMARY

By the present invention, there is provided a process for the manufacture of methylolated phenol-sulfonic acid whereby one can prepare aqueous solutions of methylolated phenol-sulfonic acid which are substantially completely free of excess alkali. Advantageously, this process may be economically and conveniently practiced using conventional reactors of the type employed to make phenol-aldehyde condensates.

To practice the process of this invention, one begins by contacting a molar excess of formaldehyde with a phenol sulfonic acid alkali metal salt under aqueous liquid phase conditions at a temperature ranging from about 65° C. up to atmospheric reflux temperature in the presence of sufficient dissolved hydroxide of at least one Group IIA metal (of the Periodic Table of the Elements) to cause the pH of the liquid phase to fall in the range of from about 7.5 to 10.0 (preferably from about 8.0 to 10.0). Such contacting produces a methylolated phenol-sulfonic acid.

Phenol-sulfonic acids suitable for use in this invention as starting materials for the manufacture of sulfonated phenolic resins are characterized by having the general formula when in their pure acid form (preferably):

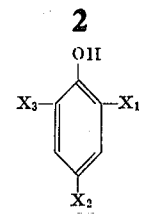

where $X_1$, $X_2$, and $X_3$ are each individually selected from the group consisting of hydrogen and $-SO_3H$, and, in any given molecule thereof, at least one of said X's is $-SO_3H$, and at least one other of said X's is hydrogen.

The extent of methylation can, of course, vary, depending upon the type of product desired and the wishes of the manufacturer. I prefer to continue such contacting for a time sufficient to substantially completely react with formaldehyde the hydrogen atoms on the phenol nucleus of the starting phenol-sulfonic acid in positions ortho and para to the phenol hydroxyl group. In general, the contacting is continued under times, temperature and pressure conditions which taken together are at least sufficient to methylolate said phenol sulfonic acid starting material.

Preferred reaction or contacting temperatures range from about 70° C. to 80° C. Convenient reaction times typically range from about 20 minutes to 4 hours. Preferably, the pH is maintained in the range from about 8 to 10. At pH values above about 8, not only is the sulfonic acid salt formed, but also a sufficient percentage of phenate anions are formed to activate ortho and para positions on the phenyl nucleus relative to the hydroxyl group, which is desirable in methylolating formula (1) compounds with formaldehyde. At pH values above about 10, the undesirable Canizzaro reaction can occur as a side reaction. Vacuum reflux conditions or other means can be used to limit condensation of product methylolated compounds and control reaction temperature (through steam evolution). Organic liquids may be present, but it is much preferred that at least 50 weight per cent of the total solvent comprising the liquid phase be water.

To maintain the desired basic pH, any metal hydroxide of metals generally from Group IIA of the Periodic Table of the Elements is employed (calcium hydroxide being preferred). As made, the methylolated, sulfonated products are thus in a salt form.

A preferred class of such methylolated, phenol sulfonated acids is one wherein the product is substantially monomeric and each molecule contains only a single $-SO_3H$ group in the form of a metal salt or ammonium salt (depending on the cations associated with the base catalyst employed in manufacture). Thus, such acids are in salt form (i.e. are not neutralized or acidified); and have two $-CH_2OH$ (methylol) groups per molecule. The presence of two $-CH_2OH$ groups per molecule insures completely polymerizability of a methylolated and sulfonated product as those skilled in the art will readily appreciate. For reasons of structural predictability in the ultimate resole resin compositions of the invention, a more preferred class of such preferred class of products contains a single such sulfonic acid salt group per molecule each located in the para position relative to phenolic (nuclear) hydroxyl groups.

Although such methylolated, sulfonated products can be readily separated as solids or concentrates from an aqueous reaction product mixture (as by vacuum distillation of fluids, or the like), for use in this invention, such products are preferably used in the form of aqueous solutions containing from about 30 to 80 weight per cent total of such products. More preferred such solutions contain from about 50 to 70 weight per cent of such products.

Preferably, such an aqueous solution is prepared so as to contain very little (e.g. less than about 5 weight per cent based on total dry weight of methylolated, sulfonated product) dissolved free formaldehyde, but it obviously can be prepared to contain higher percentages of such, depending upon reaction conditions employed, and the end uses intended for such.

Typically and preferably, a water soluble methylolated, sulfonated product used in this invention is composed largely of monomeric species with some water soluble polynuclear derivatives thereof, the relative amount of polynuclear derivatives in any given such product being dependent upon the degree of advancement associated therewith, as those skilled in the art will appreciate.

In general, the mol ratio of combined formaldehyde to phenol sulfonic acid of formula (1) in methylolated, sulfonated products (conveniently calculated from the starting phenol sulfonic acids used in this invention) can range from about 0.8:1 to 2:1, although ratios of from about 1.5:1 to 1.9:1 are preferred.

While formula (1) compounds can be prepared by methods known to the prior art, one particularly preferred preparation method for the present invention involves reaction of phenol with sulfuric acid under conditions such that for each mol of phenol there is present at least about one mol of sulfuric acid. The reaction or contacting of phenol with sulfuric acid is conducted under liquid phase conditions using sub-atmospheric pressures of from about 20 to 29 in. Hg vacuum at temperatures ranging from about 85° to 95° C. The water generated through reaction of the sulfuric acid with the phenol is continuously removed by distillation from the reaction zone so as to promote a substantially complete reaction between sulfuric acid and phenol, thereby avoiding possible later problems of product purification.

The particular formula (1) compound used (whether made as just described or otherwise) to make a methylolated, sulfonated product is water soluble and is neutralized and made basic with a base catalyst as indicated above before reaction with formaldehyde.

For convenience and stability in storing and handling a methylolated, sulfonated resin used in this invention, it is much preferred to keep such in a salt form, such as results inherently when one makes same in accordance with the teachings of this invention under basic conditions.

Such a product solution of methylolated phenol-sulfonic acid produced as just described is, after condensation is completed, allowed to cool (as in air at room temperature or the like) to a temperature falling in the range from about 25° to 40° C.

Thereafter, one bubbles carbon dioxide gas through the reaction mixture. The carbon dioxide reacts with the Group IIA metal ions present in the solution and results in the formation of the highly insoluble carbonate salts of Group IIA metals. The rate of carbon dioxide gas addition is unimportant but is preferably selected so as to maximize exposure of the solution being treated to a minimum amount of carbon dioxide so as to encourage the greatest possible production of insoluble carbonate in the shortest practical time consistent with equipment and material cost considerations. In this way, excess alkali and salt is removed from the solution being treated to leave only the starting alkali metal ions in the product solution which are desirable in order to maintain the product in a salt form (as indicated above).

The insoluble carbonate salts are readily separated from the resulting product solution by filtration, settling, or the like to leave the desired excess alkali free product.

EMBODIMENTS

The following examples are set forth to illustrate more clearly the principles and practice of this invention to one skilled in the art and they are not intended to be restrictive but merely to be illustrative of the invention herein contained.

EXAMPLE 1

800 Grams 75 per cent para-phenol-sulfonic acid (p-PSA) in a reaction flask are neutralized with 312.5 grams 50 per cent NaOH to a pH of approximately 7. 412.5 Grams of 50 per cent formalin (2 moles HCHO) are then added followed by 64.0 grams $(Ca(OH)_2$ slurried in 128.0 grams water. The mixture is heated at 80° C. 1½ hours under vacuum reflux. The reaction is continued at 80° C. under vacuum distillation conditions to remove approximately 31 parts distillate per 100 parts charged p-PSA solution (to adjust solids content of final product to approximately 55 per cent). The reaction product is then cooled to 35° C. and $CO_2$ is bubbled through it until the pH equilibrated at about 7.2. The calcium carbonate thus formed is removed by filtration.

EXAMPLE 2

Example 1 was repeated except that the reaction was carried out for 3 hours at 70° C. entirely under vacuum reflux conditions. Solids content of the resulting filtered product was approximately 47 per cent.

EXAMPLE 3

Example 2 was repeated except that the reaction was carried out for 5 hours at 60° C.

EXAMPLE 4

Example 1 was repeated except that the 412.5 grams 50 per cent formalin was replaced by 309 grams, 50 per cent formalin (1.5 moles) and only 24.5 parts distillate were removed.

The product solutions produced by the process of this invention characteristically have a pH range of about 7.0–7.5. When such an essentially alkali free liquid product is admixed with a separately formed water-soluble alkali free resole, a thermosettable sulfonated phenolic resin is produced which can be used to impregnate porous, sheet-like media (especially cellulosic's like paper) for producing ion-exchange media. After impregnation, such a medium is characteristically dried and exposed to thermosetting temperatures (e.g. 150°–200° C.). Product sheets characteristically display very low excess alkalinity.

What is claimed is:

1. In a process for methylolating a phenol-sulfonic acid by condensing it with formaldehyde under base catalyzed aqueous conditions, the improvement which comprises the steps of:

A. contacting formaldehyde with an aqueous solution of an alkali metal salt of the phenol-sulfonic acid having at least one reactive hydrogen ortho or para to the phenolic hydroxyl group, in the presence of a group IIA metal hydroxide, at a temperature in the range from about 65° C. to atmospheric reflux, for a time sufficient to replace the reactive hydrogen substantially completely with methylol groups;

B. cooling the reaction mixture to a temperature of approximately 25 to 40° C.; and C. bubbling carbon dioxide gas through the reaction mixture to precipitate the group IIA metal hydroxide as the insoluble carbonate.

2. The process of claim 1 wherein said phenol-sulfonic acid is characterized by having the formula when in pure acid form:

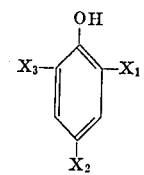

where $X_1$, $X_2$ and $X_3$ are each individually selected from the group consisting of hydrogen and $-SO_3H$, and, in any given molecule thereof, at least one of said X's is $-SO_3H$ and at least one other of said X's is hydrogen.

3. The process of claim 1 wherein said precipitated carbonate salt is removed from the reaction mixture by filtration.

4. The process of claim 1 wherein said contacting is conducted using an aqueous phase pH of from about 8 to 10.

5. The process of claim 1 wherein said contacting is conducted at temperatures ranging from about 70° to 80° C.

6. The process of claim 1 wherein the product reaction mixture contains from about 30 to 80 weight per cent total of methylolated phenol sulfonic acid.

7. The process of claim 2 wherein the mol ratio of combined formaldehyde to phenol sulfonic acid ranges from about 0.8:1 to 2:1.

8. In a process for methylolating a phenol-sulfonic acid by condensing it with formaldehyde under base catalyzed aqueous conditions, the improvement which comprises the steps of:

A. contacting formaldehyde with an aqueous solution of the sodium salt of a phenol-sulfonic acid characterized by the formula:

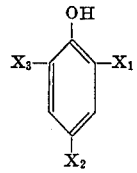

where $X_1$, $X_2$ and $X_3$ are selected from the group consisting of hydrogen and $-SO_3H$ and at least one X group is hydrogen and at least one other X group is $-SO_3H$; in the presence of calcium hydroxide, at a temperature in the range from about 65° C. to atmospheric reflux, for a time sufficient to replace hydrogen ortho and para to the phenolic hydroxyl group substantially completely with methylol groups;

B. cooling the reaction mixture to a temperature of approximately 25° to 40° C.;

C. bubbling carbon dioxide gas through the reaction mixture to precipitate the calcium hydroxide as calcium carbonate; and D. removing the calcium carbonate by filtration.

9. The process of claim 8, wherein $X_2$ is $-SO_3H$ and $X_1$ and $X_3$ are hydrogens.

* * * * *